United States Patent [19]
Day et al.

[11] 3,826,972
[45] July 30, 1974

[54] METHOD AND APPARATUS FOR DETECTING NUCLEAR MAGNETIC RESONANCE

[75] Inventors: Edmund P. Day, Palo Alto; William M. Fairbank, Menlo Park; James E. Opfer, Palo Alto, all of Calif.

[73] Assignee: The Board of Trustees of Leland Stanford Junior University, Stanford, Calif.

[22] Filed: Aug. 17, 1973

[21] Appl. No.: 389,320

[52] U.S. Cl. ............................................. 324/0.5 R
[51] Int. Cl. .......................................... G01n 27/78
[58] Field of Search ........ 324/0.5 R, 0.5 A, 0.5 AC, 324/0.5 AH, 0.5 B

[56] References Cited
UNITED STATES PATENTS
| | | | |
|---|---|---|---|
| 3,191,119 | 6/1965 | Singer | 324/0.5 B |
| 3,419,794 | 12/1968 | Weaver | 324/0.5 A |

OTHER PUBLICATIONS

J. A. Glasel, A Simple Device for T1 Measurements on a Nuclear Magnetic Resonance Spectrometer by Adiabatic Rapid Passage, Journal of Scientific Instruments, 1968, Series 2, Vol. 1, pp. 963–964.

R. G. Parker and J. Jonas, Adiabatic Fast Passage Method for Spin–Lattice Relaxation Measurements, Review of Scientific Instruments, 41 (3), March 1970, pp. 319–321.

Primary Examiner—Michael J. Lynch
Attorney, Agent, or Firm—Flehr, Hohbach, Test, Albritton & Herbert

[57] ABSTRACT

Apparatus for detecting nuclear magnetic resonance in which the sample is subjected to a high magnetic field in one direction to polarize the nuclear spins, then an alternating radio frequency magnetic field is applied to the sample and varied from a frequency below the resonant frequency of interest of the sample to a frequency above the resonant frequency, or vice versa, at a rate which provides adiabatic fast passage. A detector detects the change in the magnetization parallel to the direction of the magnetic field during said adiabatic fast passage. The method of detecting nuclear magnetic resonance which comprises polarizing the sample, changing the steady state value of the longitudinal magnetization and detecting the change in the steady state value of the longitudinal magnetization.

13 Claims, 9 Drawing Figures

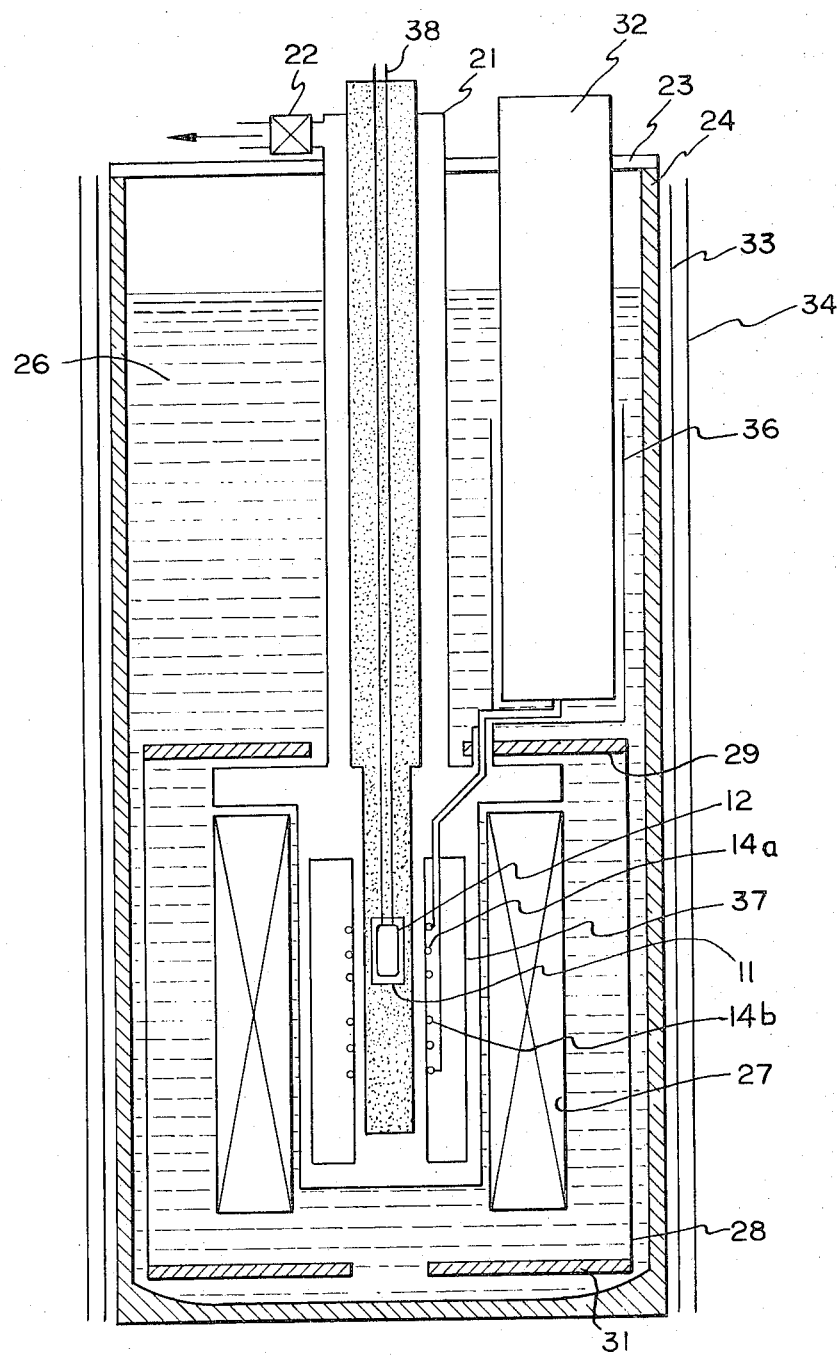
F I G. 4

31.81 MHz  1.25 Sec/div.
166 kHz/div.

Sample: LiF
Li⁷ spin: 3/2

12.36 MHz  40 sec/div.
166 kHz/div.

Sample: LiF
F¹⁹ spin: 1/2

29.92 MHz  10 sec/div.
166 kHz/div.

METHOD AND APPARATUS FOR DETECTING NUCLEAR MAGNETIC RESONANCE

BACKGROUND OF THE INVENTION

This invention relates generally to the detection of nuclear magnetic resonance signals by adiabatic fast passage and more particularly to an apparatus and method for detecting nuclear magnetic resonance by measuring the change in steady state value of longitudinal magnetization during an adiabatic fast passage.

Broad line nuclear magnetic resonance signals in liquids and solids have been detected previously by employing adiabatic fast passage. In the past the adiabatic fast passage has been detected by following the transverse magnetization with an rf coil perpendicular to the applied dc field. The rf coil detects a pulse as the spins swing past the transverse plane on their way to inversion during the adiabatic fast passage. This pulse has its magnitude reduced from its maximum value by the factor ($H_1/H_L$) unless the rf power is large enough to meet the condition that $H_1 > H_L$. The reason is that the spins are out of phase by this amount due to spin-spin interactions whenever the effective field falls below the value of the local field $H_L$. The other nuclear magnetic resonance detection techniques involving pulses, such as the spin echo technique, also require a large signal and large amounts of rf power.

OBJECTS AND SUMMARY OF THE INVENTION

The new apparatus and method disclosed herein for detecting adiabatic fast passage by following changes in the longitudinal magnetization makes it possible to detect maximum signals using less rf power than previous techniques. Furthermore, the signal magnitude is easily calibrated and interpreted. Low level rf power will be useful in isotope trace analysis in solids, in thermometry, in geological dating, in the detection of broad lines in biological molecules, and in other applications where low rf power or simple interpretation of signal magnitude is an advantage. The simple nuclear magnetic resonance technique described will be useful for detecting weak broad lines, for high resolution nuclear magnetic resonance, and for liquid flow measurement including blood flow.

It is a general object of the present invention to detect nuclear magnetic resonance by detecting the changes in the steady state value of longitudinal magnetization during an adiabatic fast passage.

It is another object of the present invention to provide a method of detecting nuclear magnetic resonance by adiabatic fast passage in which low intensity rf fields are employed.

It is a further object of the present invention to provide a simple apparatus for providing maximum intensity nuclear magnetic resonance signals in solids and other substances using low power rf for causing adiabatic fast passage.

The foregoing and other objects of the invention are achieved by an apparatus which includes means for providing a high uni-directional magnetic field to a sample to polarize the spins in one direction, means for applying a low power alternating magnetic field to the sample whose frequency is swept from a first frequency below the resonant frequency of interest to above the resonant frequency of interest, or vice versa, at a rate which provides adiabatic fast passage, and means detecting the resulting change in magnetization parallel to the direction of the high magnetic field. The invention also relates to the method of detecting adiabatic fast passage by detecting changes in the steady state value of longitudinal magnetization during an adiabatic fast passage.

BRIEF DESCRIPTION OF THE DRAWINGS

FIG. 4 is a sectional view of apparatus suitable for carrying out the present invention.

DESCRIPTION OF PREFERRED EMBODIMENTS

Figure 1:
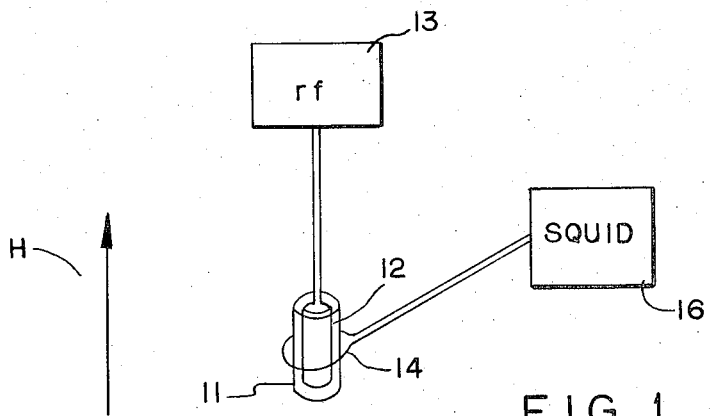
FIG. 1 schematically shows apparatus in accordance with the invention.

FIG. 1 schematically shows apparatus in accordance with the invention and is useful in describing the operation of the apparatus to detect nuclear magnetic resonance. A sample container 11 which may be at room temperature serves to hold the sample under test in a high uni-directional magnetic field H. The action of field H is to line up the nuclear spins in a predetermined direction. A coil 12 is disposed to apply an rf magnetic field to the sample in a direction transverse to the polarization of the spins. The coil 12 is driven by a suitable rf generator 13. A superconducting pick-up coil 14 surrounds the sample and is disposed parallel to the longitudinal magnetic field H. The pick-up coil 14 is connected to a superconducting quantum interference device (SQUID) of well known construction, for example, of the type described in Cryogenics 12, 19, (1972). The high magnetic field may, for example, be derived by employing a superconducting magnet capable of providing relatively high stable uni-directional fields. To detect the nuclear magnetic resonance, the rf frequency $\omega$ is varied from a frequency which is well below the resonant frequency of interest to well above the resonant frequency in such a manner that the spin's magnetization is inverted. This causes a change $2M_0$ in the SQUID reading where $M_0$ is the equilibrium magnetization of the resonant nuclei. The signal $2M_0$ is independent of the rf power level as long as the conditions of adiabatic fast passage have been met.

Figure 2:
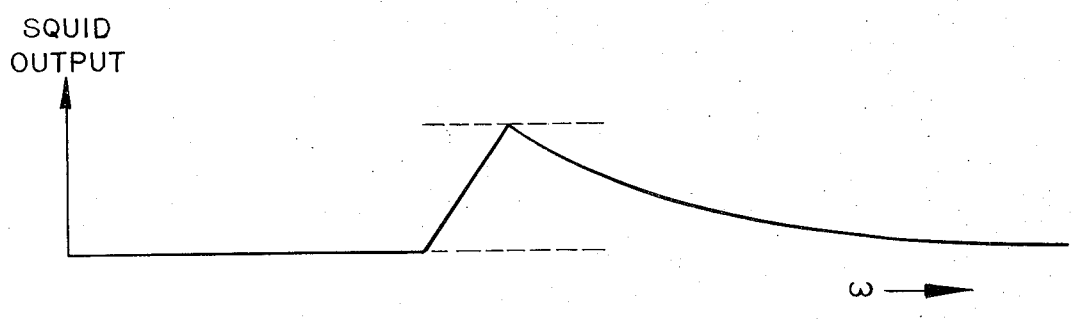
FIG. 2 shows output as a function of rf frequency for apparatus of the type shown in FIG. 1.

An idealized signal output from the SQUID in a nuclear magnetic resonance experiment is indicated in FIG. 2. The X axis shows the variation of rf frequency $\omega$ during an adiabatic fast passage. The SQUID output is shown in the Y direction. The rise in SQUID output as the rf sweep frequency reaches the resonant region indicates the inversion of magnetization. The exponential decay of signal from its maximum value is due to spin-lattice relaxations which cause the inverted magnetization to return to its original equilibrium position.

Figure 3:
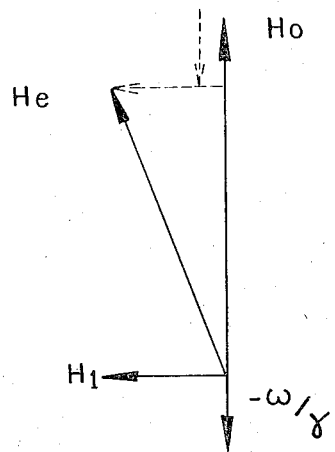
FIG. 3 is a vector diagram useful in explaining adiabatic fast passage.

Adiabatic fast passage will be more clearly understood with reference to FIG. 3.

The vectors show dc field $H_o$, the field equivalent vector for the radio frequency - $\omega/\gamma$, and the amplitude of the rf field $H_1$. These sum to give the effective field $H_e$ seen by the spins in the rotating frame. In an adiabatic fast passage experiment the rf field is varied from well below the resonant frequency of interest to well above resonance in such a manner that the spins' magnetization follows the changing direction of $H_e$.

The sweep rate of the rf must fall in the proper range for adiabatic fast passage to be successful in inverting the magnetization. The time interval required to pass through the line width must be short compared with the spin-lattice relaxation time in order that the spins not relax back to their thermal equilibrium position during the sweep. In this sense the passage must be fast. $1/\gamma H_1 \underset{ADIABATIC}{\leq} \omega_1 \Delta t / \Delta \omega \underset{FAST}{\leq} T_1$ The expression $\omega \Delta t / 1 \Delta \omega$ is a statement of the time ($\Delta t$) required to pass through a line of width $\omega_1 = \gamma H_1$ when changing the rf ($\Delta \omega$). On the other hand, the sweep must be slow enough such that the spins make many Larmor precessions at each "location" of the effective field $H_e$ which is changing direction during the sweep. In this sense the sweep must be made adiabatically. This adiabatic condition is hardest to meet right at resonance when the effective field $H_e$ has its minimum value equal to $H_1$. At this point the Larmor precessional frequency of the spins is at its minimum value $\gamma H_1$ and the time of precession is given by $1/\gamma H_1$. Inverting these expressions and dividing through by $\omega_1 = \gamma H_1$ gives the condition for adiabatic fast passage: $|\gamma H_1|^2 \underset{ADIABATIC}{\gg} d\omega/dt \underset{FAST}{\gg} \max (\gamma H_1/T_1, \gamma H_L/T_1, \gamma \Delta H/T_1)$ The additional condition $1/T_2 \approx \gamma H_1$ holds for solids where $T_2 \ll T_1$. Here $\gamma$ is the gyromagnetic ratio of the spins, $H_1$ the rf field amplitude, $\omega$ the radio frequency, $T_1$ the longitudinal relaxation time of the spins, $T_2$ the transverse spin relaxation time, $H_L$ the local field in a rigid lattice, and $\Delta H$ the inhomogeneity of the dc magnetic field. For this type of experiment, which uses a pick-up coil sensitive to changes in $M_z$, the dc magnetic field is held absolutely constant. The sweep through resonance is performed by sweeping the radio frequency.

Referring to FIG. 4, apparatus in accordance with the invention is illustrated. The apparatus includes a double walled Dewar 21 which may be connected via the valve 22 to a suitable diffusion pump. The chamber defined by the Dewar is adapted to receive sample cylinder 11. The sample can be maintained at any desired temperature from 4°K to 400°K using forced gas flow through the chamber. On the other hand, the chamber may be maintained at room temperature. The pick-up coil 14 is in the form of two sections 14a and 14b which are matched sections and wound in opposite directions to provide cancellation of effects common to sample and control while detecting events unique to the sample. The double walled Dewar 21 is supported by a plate 23 which rests on main Dewar flask 24. The space between the Dewar 21 and 24 is filled with liquid helium as indicated by the dotted lines 26 to maintain cryogenic temperatures in the space between the flasks 21 and 24 while permitting the sample to be at a controlled temperature. A persistent mode magnet 27 is disposed at the bottom of the Dewar flask 24 adjacent to the sample to provide high stable dc magnetic fields to the sample. The large magnetic field of the persistent mode magnet is confined to the vicinity of the sample by surrounding the magnet with a superconducting cylinder 28 capped with ferromagnetic end pieces 29 and 31. The shield configuration enhances the magnet's homogeneity and isolates the high field region at the sample from the low field region of the magnetometer 32. The magnetometer or SQUID 32 is shielded from he earth's field by two mu metal shields 33 and 34 and from field within the apparatus with a superconducting shield 36. The design of the apparatus creates a stable magnetic field environment at the pickup coil.

Flux creep, vibration and paramagnetism are three sources of potential noise which have been dealt with in the present design. Flux creep is the intrinsic instability of the high field magnet. To shield against this noise and cut down on the effects of vibration, a superconducting shield 37 capable of being heated normal is built in the apparatus between the magnet and the pickup coil. The effects of vibrations are reduced by attaching the pickup coils 14a, 14b rigidly to the shield. Vibration of the unit relative to the magnet does not lead to noise at the pick-up coil as long as there is no relative motion of the coil and the shield. Aluminum and OFHC copper were used as the construction materials within the shield to eliminate the presence of all but diamagnetic materials from the vicinity of the pick-up coil. Temperature regulation of the shield coil unit has been used in the present apparatus to eliminate noise from this source.

To carry out an experiment, the frequency of the rf energy applied along the coaxial cable 38 is varied from well above resonance to well below resonance, or vice versa, at a rate consistent with adiabatic fast passage. This results in the inversion of the longitudinal magnetization. This causes the change $2M_0$ in the SQUID or magnetometer reading where $M_0$ is the equilibrium magnetization of the resonant nuclei. The signal $2M_0$ is independent of rf power level as long as the condition of adiabatic fast passage has been met.

Figure 5:
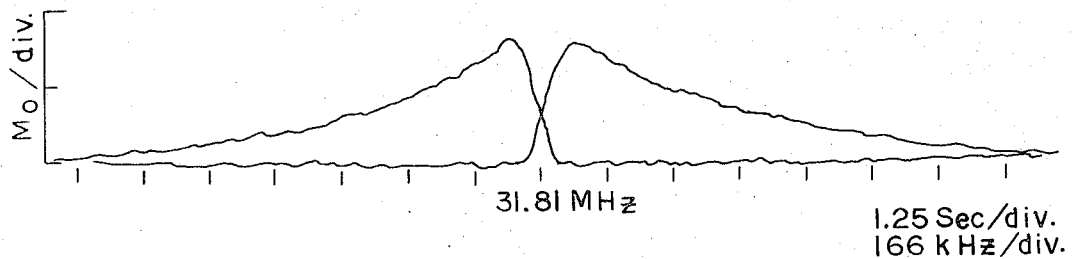
FIG. 5 shows the output of the apparatus during an adiabatic fast passage on the protons of water.

An adiabatic fast passage experiment was performed on protons in water and the results of the experiment are shown in FIG. 5.

This trace is a superposition of sweeps in opposite directions through resonance. For this curve the fast passage conditions are as follows:

$|\gamma H_1|^2 > d\omega/dt > \gamma \Delta H/T_1$, $3.2 \times 10^6/\text{sec}^2 > 0.84 \times 10^6/\text{sec}^2 > 0.21 \times 10^6/\text{sec}^2$.

The linewidth appears as the distance between rise points of the opposing sweeps. The broad line is due to the magnet's field inhomogeneity over the sample, which was measured with a Hall probe to be $3.1 \times 10^{-3}$. The rise slope in each direction depends on the distribution of Larmor frequencies arising from this field inhomogeneity. The longitudinal spin relaxation time ($T_1$) of the protons in water is apparent as the exponential decay from maximum signal in either direction. This trace gives a value of $3.5 \pm 0.4$ sec, consistent with the known value. The crossover point of the opposing sweeps yields a resonant frequency of $31.81 \pm 0.005$ MHz, consistent with the field of 7.47 kOe measured by the Hall probe.

The ordinate of the trace is calibrated in units of the equilibrium magnetization $M_0$ of protons in water at 25°C in the applied field. The output of the SQUID magnetometer was read as the empty sample holder at 25°C was inserted into the superconducting pick-up coil with the magnet charged to 7.47 kOe. This signal was subtracted from a similar curve taken as the water-filled sample holder was inserted. These data, in conjunction with the known value of $0.72 \times 10^{-6}$ (cgs) for the diamagnetic susceptibility of water at 25°C, calibrated the output of the SQuID magnetometer in cgs units of susceptibility. The signal does not reach the predicted value of $2M_0$ because of imperfect rf coil geometry and a slow scan rate. More rapid scanning of the resonance was ruled out by the time response of the eddy-current shielding in the Dewar walls between the sample and the pick-up coil.

Figure 6A:
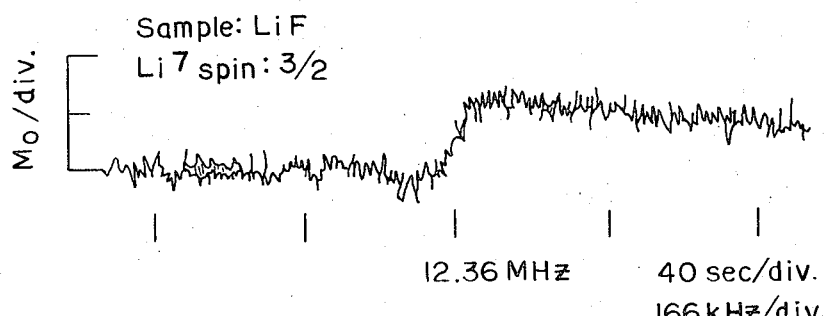
FIGS. 6A and 6B show a single passage through the lithium and fluorine lines of lithium fluoride powder at 25°C.
Figure 6B:
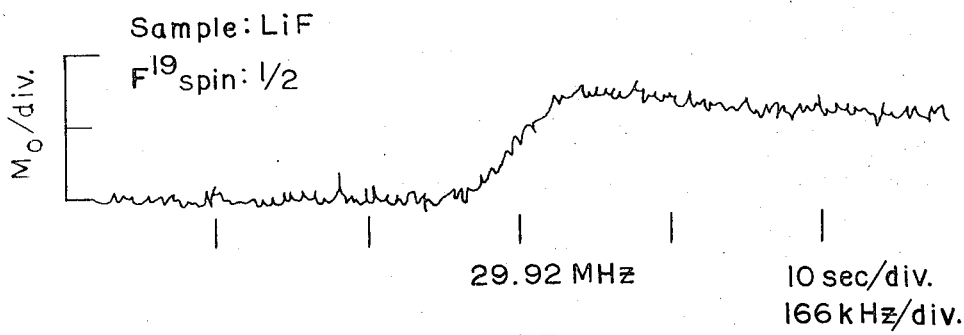

The results of adiabatic fast passage experiments on a very pure sample of powdered LiF are shown in FIG. 6. The top trace shows a single passage through the Li$^7$ line under the conditions $|\gamma H_1|^2 >> d\omega/dt >> \gamma \Delta H/T_1$, $3.3 \times 10^5/\text{sec}^2 >> 2.6 \times 10^4/\text{sec}^2 >> 69/\text{sec}^2$ The bottom trace is that of a single passage through the F$^{19}$ line with $|\gamma H_1|^2 >> d\omega/dt >> \gamma \Delta H/T_1$, $1.0 \times 10^6/\text{sec}^2 >> 1.0 \times 10^5 >> 2.8 \times 10^2/\text{sec}^2$ In each case the linewidth appears as the distance between the rise point and the point of maximum signal. The linewidth is due to the magnet inhomogeneity of 23 G. The known local field of LiF is approximately 8 G. The midpoints of the rise slopes of these traces correspond to resonant frequencies consistent with the 7.47-kOe dc field. The ordinate of each trace has been calibrated against the bulk susceptibility of water as described previously. The number density of each nucleus was found using the measured density of the given powdered sample. Loss of signal from the expected value of $2M_0$ is due to imperfect rf coil geometry resulting in an unwanted longitudinal rf field component over a portion of the sample volume.

The longitudinal relaxation time $T_1$ of either nucleus is long compared with the time scale of the trace as shown by the lack of decay of signal (S) from its maximum value. The relaxation time was measured by taking a trace after waiting a long time compared with $T_1$. This trace was followed by a second trace taken a time $t$ later. The process was repeated and the points $\ln[1-S(t)/S(0)]$ were plotted against $t$ to find $T_1$. The value of $T_1$ for Li$^7$ was found to be $(3.5 \pm 0.5) \times 10^3$ sec while for F$^{19}$ it was $(2.1 \pm 0.3) \times 10^3$ sec.

The maximum signals have been obtained at power levels more than 40 dB down from the rf power required to yield maximum signal using conventional detection. That is, lines 8 G wide have been detected at full intensity using approximately 50 mG rf amplitude. With conventional detection of the transverse pulse the signal would have been reduced by $50 \times 10^{-3}/8$ under these conditions.

Improved sensitivities can be obtained by separating the high field region in which the spins are originally at equilibrium and the region in which adiabatic fast passage is performed and the reversal of longitudinal magnetization is detected. Thus, the high fields are applied to the sample to longitudinally magnetize and polarize the spins and thereafter the sample is moved into the region of the rf and pick-up coils where an adiabatic fast passage is performed and the longitudinal magnetization reversal detected.

Figure 7:
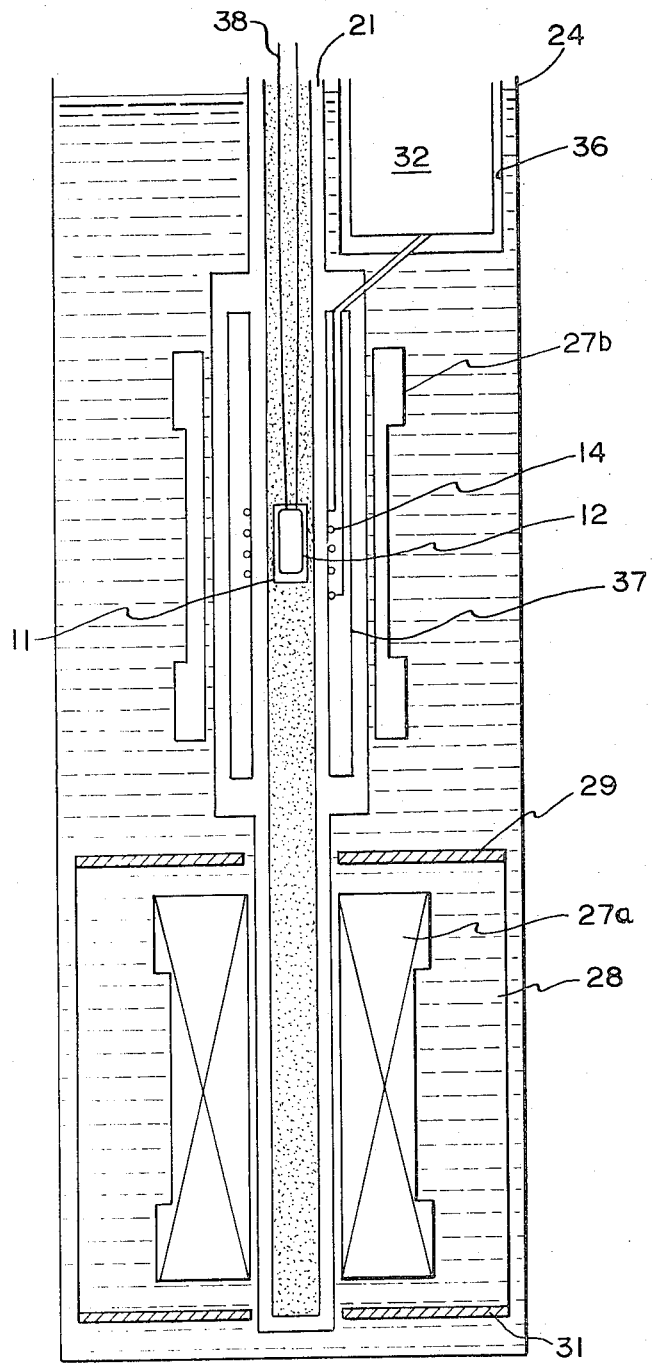
FIG. 7 is a schematic diagram of apparatus in which the sample is displaced after being polarized.

Referring to FIG. 7, apparatus similar to that of FIG. 4 is illustrated. Only the lower inside portion of the apparatus is illustrated since in other respects it is identical to that shown in FIG. 4. The apparatus includes the persistent mode homogeneous high field magnet 27a surrounded by the shield 28, 29, 31. The sample for which the spins are to be aligned is located in this region for a time long compared with $T_1$ in order that they may be fully polarized. The sample is then moved rapidly, compared to the period $T_1$, to the low field region where SQUID detection takes place. The low field magnet is labelled 27b. In the case of broad lines in solid, the field will be larger than $H_1$ to avoid loss of signal due to phase incoherence caused by spin-spin interactions. In the case of liquid samples, flow can be used to move the sample from the high field region to the low field SQUID detection region.

Figure 8:
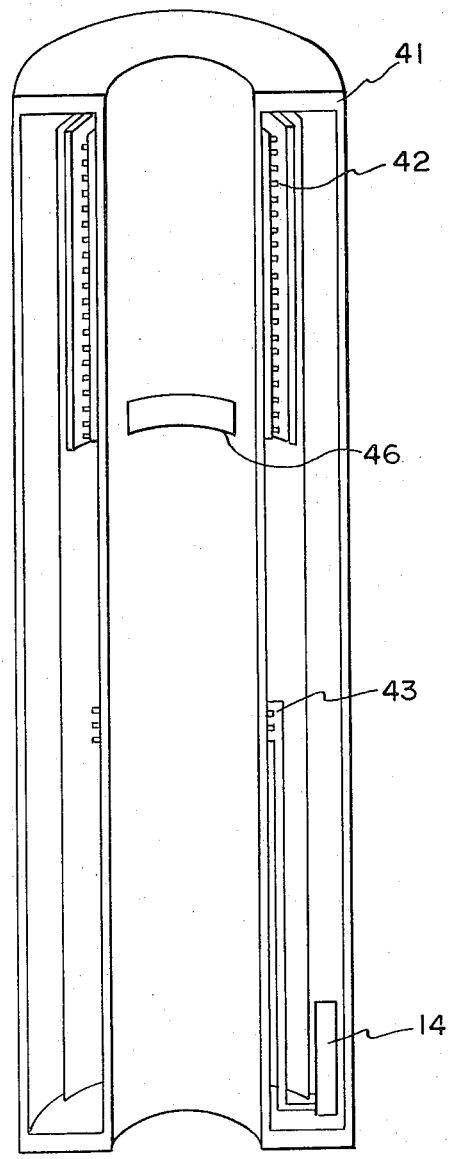
FIG. 8 is a schematic drawing of a device suitable for measuring blood flow and cross-sectional area in arteries employing the apparatus of the present invention.

The detection of the change in steady state value of longitudinal magnetization by means of a magnetometer can be used to measure the velocity of fluids such as the velocity of blood in an artery. Referring to FIG. 8, suitable apparatus is schematically illustrated. The apparatus comprises a Dewar flask 41 with a superconducting persistent magnet 42 disposed at one end and serving to provide longitudinal magnetization and polarize the spins in the material flowing through the center of the device. In blood flow, the device would be placed about the arm and the blood would flow down the axis of the device where the blood nuclei would be polarized. A shielded pickup coil is disposed spaced from the magnet and adapted to pick up the signals from the spins in the blood sample. The pickup coil is connected to a magnetometer 44. An rf coil is disposed adjacent the magnet 42 and serves to provide an adiabatic fast passage.

The apparatus is operated as follows. The arterial blood flow carries the protons in the blood into the high field region of the persistent mode magnet 42. While in this field, the nuclei are polarized according to the expression $(1 - \exp^{-t/T}1)$. Upon leaving the magnet the spins lose their polarization at a rate given by $\exp^{-t/T}1$. Here $T_1$ is the spin-lattice relaxation time of the protons in blood and the assumption has been made that the spins spend equal times in the high field region and outside the high field region before arriving at the SQUID detection coil. The magnetization change for adiabatic fast passage at the detection coil is $2M_0(1 - \exp^{-t/T}1)\exp^{-t/T}1$ which has a maximum value of $2M_0(¼)$ when $t = .7T_1$. The signal at the detection coil is a constant unchanging baseline in time until the rf coil is used to invert the spins. Once this has been done at a known instant in time, the blood flow velocity can be calculated from the ratio of the distance to the detector coil from the rf coil divided by the time it took the signal to show up at the detector coil.

This same technique can also yield data on the cross-sectional area of the arteries carrying blood into the detection coil since the magnitude of the adiabatic fast passage signal will depend on the volume of magnetized blood which is seen by the detection coil. Since the timing of the rf sweep used to cause spin inversion can be correlated with heart beat, it will be possible to measure blood flow velocity and arterial cross-section as a function of time throughout the heart beat cycle.

Thus, there has been provided an improved apparatus and method for detecting nuclear magnetic resonance.

We claim:

1. Apparatus for detecting nuclear resonance in a sample comprising means for generating a highly stable uni-directional magnetic field, means for placing a sample in said magnetic field to polarize the nuclear spins, means for applying alternating magnetic field to the sample at a frequency which is variable at a predetermined rate from below the resonant frequency to above the resonant frequency to cause adiabatic fast passage, and means for detecting the change in longitudinal magnetization during the adiabatic fast passage.

2. Apparatus as in claim 1 wherein said means for generating a highly stable uni-directional magnetic field comprises a superconducting persistent mode solenoid.

3. Apparatus as in claim 1 wherein said means for detecting the adiabatic fast passage comprises a pick-up coil disposed with its axis parallel to the uni-directional magnetic field.

4. Apparatus as in claim 3 including a magnetometer connected to said coil adapted to indicate the detection of adiabatic fast passage.

5. Apparatus as in claim 1 wherein said means for detecting the change in longitudinal magnetization includes a magnetometer.

6. Apparatus as in claim 5 wherein said magnetometer is superconducting.

7. Apparatus as in claim 4 in which the pick-up coil and magnetometer are superconducting.

8. Apparatus as in claim 1 wherein said highly stable uni-directional magnetic field is available at one region of said apparatus and wherein said means for causing the adiabatic fast passage and the means for detecting the change in longitudinal magnetization are disposed in another region of the apparatus separate from said first region.

9. Apparatus as in claim 8 including means for moving a sample between said first and second regions whereby the sample is polarized in the first region, moved to the second region where it is subjected to an adiabatic fast passage and the change in longitudinal magnetization is detected.

10. Apparatus as in claim 1 wherein said means for detecting the change in longitudinal magnetization is spaced from said means for generating the highly stable uni-directional magnetic field and the means for applying alternating magnetic field to the sample to cause adiabatic fast passage.

11. The method of detecting nuclear resonance in a sample comprising the steps of subjecting the sample to a highly stable uni-directional magnetic field to polarize the nuclear spins, applying an alternating magnetic field to the sample at a frequency $\omega$ and varying said frequency from a first frequency below the resonant frequency of interest to above the resonant frequency of interest at a rate which provides adiabatic fast passage, and detecting the resultant change in magnetization parallel to the direction of the highly stable magnetic field.

12. The method as in claim 11 wherein the nuclear spins are polarized in a first region, the sample is moved to a second region where it is subjected to the alternating magnetic field and detection of the change in magnetization.

13. The method as in claim 11 wherein the sample continuously moves through the apparatus and is subjected to a high magnetic field in one region of the apparatus for a predetermined time and selectively subjected to an adiabatic fast passage in said region and thereafter detected to detect the change in magnetization during said selected adiabatic fast passage.

* * * * *